United States Patent Office 2,810,392
Patented Oct. 22, 1957

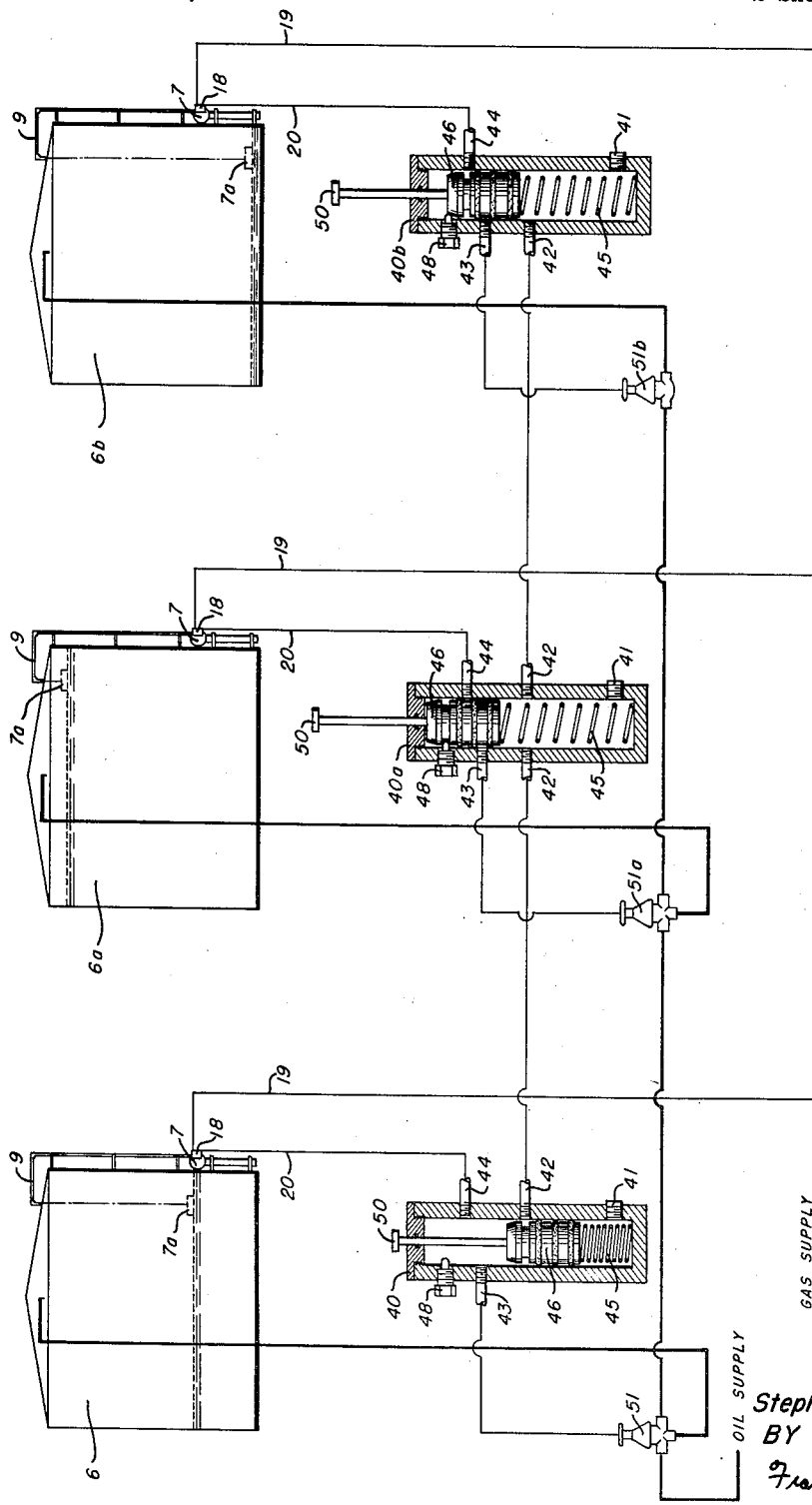

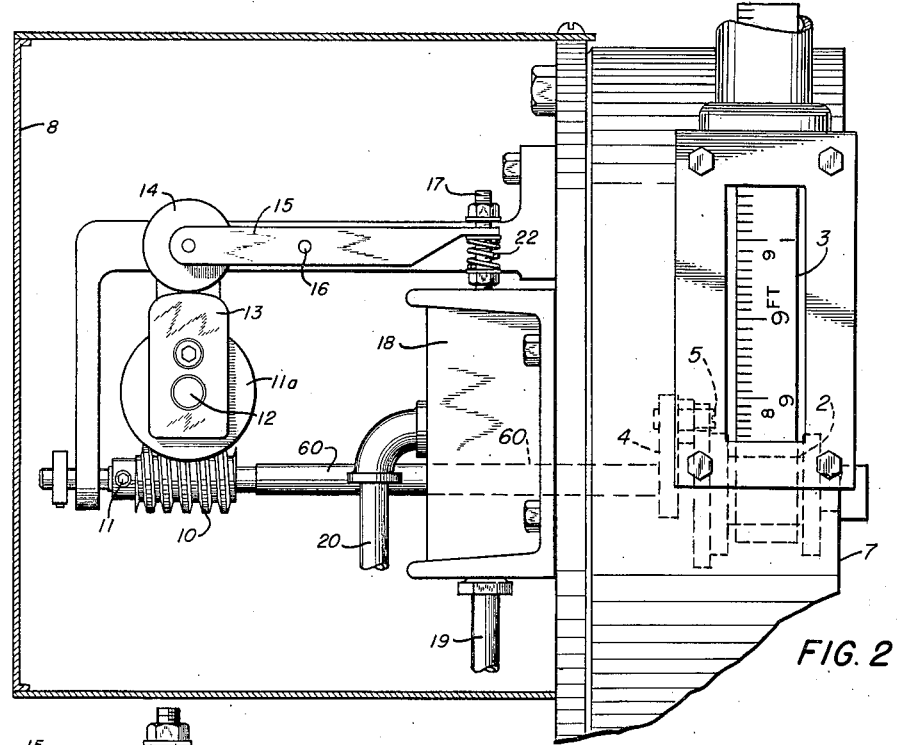
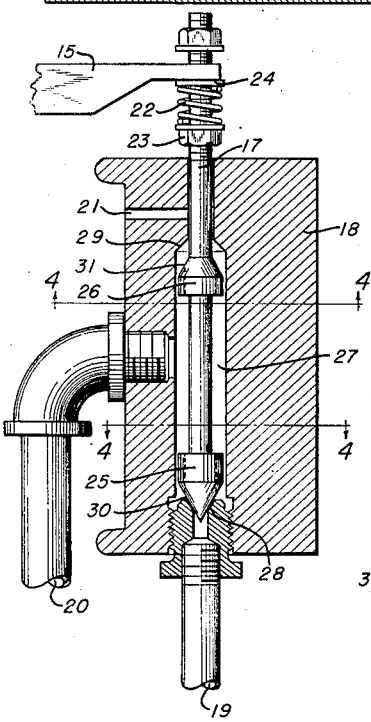
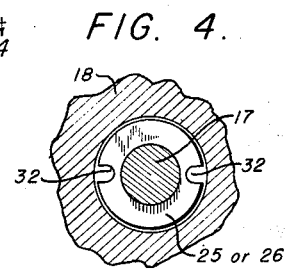
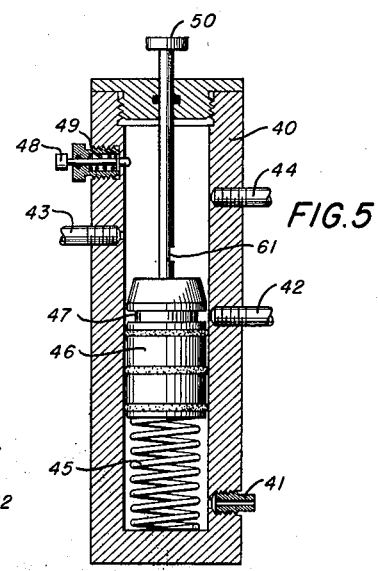

2,810,392

LEVEL CONTROL PILOT

Stephen S. Brown, La Porte, Tex., assignor, by mesne assignments, to Esso Research and Engineering Company, Elizabeth, N. J., a corporation of Delaware Application November 15, 1954, Serial No. 468,841

6 Claims. (Cl. 137—122)

This invention relates to the art of storing liquids in storage tanks. More particularly, this invention relates to a system including a control pilot valve for controlling the filling of a liquid storage tank system.

In the filling and storing of liquids within a plurality of liquid storage tanks it is highly desirable that a simple and efficient system be devised for controlling the level at which a liquid, which is filling each tank, is to be stopped thereby discontinuing the liquid filling operation for one tank and starting the filling of other tanks within the system.

It is an object of this invention to provide a system which is simple in construction and effective to efficiently control the filling of storage tanks.

Briefly described, my invention consists of a system for controlling the filling of liquid storage tanks which includes therein a level control pilot for each liquid storage tank. The level control pilot includes a valve, which may be a double valve, which in liquid filling position, permits gas from a gas suppy to flow through said control pilot to a gas operated tank selector valve. The tank selector valve, in turn, operates a diaphragm valve thereby permitting a liquid from a liquid source to flow through said diaphragm valve and into the tank. Means are provided in the system which, when the liquid within the tank is at a predetermined level, operates to move the valve within the control pilot to shut off the gas supply to the tank selector valve thereby shutting off the diaphragm valve and preventing the further supplying of liquid to the tank. Means are provided in the system for automatically filling a second storage tank upon the termination of the filling of the first tank. Any number of tanks may be included in the system.

Other objects and advantages of my new system will become apparent from the following description and drawings, in which Fig. 1 is a diagrammatic view of a plurality of liquid storage tanks and a system for filling said storage tanks with liquids;

Fig. 2 is an elevational view of a cam assembly utilized in my new system showing the assembly in the liquid cut-off position;

Fig. 3 is an enlarged sectional view of my new control pilot shown in Fig. 2;

Fig. 4 is a view taken along the lines 4—4 of Fig. 3 showing recesses cut in the valves utilized in my new control pilot; and Fig. 5 is a sectional view of a selector valve utilized in my new system.

Referring to the drawings and particularly to Fig. 1, numerals 6, 6a and 6b refer to a plurality of storage tanks, for example, oil storage tanks. Associated with each storage tank is an indicating means such as a Shand and Jurs automatic tank gauge 7. The tank gauge is shown in Fig. ST–2935 of General Catalog No. 52-C, issued in August, 1946, by the Shand and Jurs Company. This indicating means 7 gives a visual indication of the amount of liquid within the storage tank. This indication is accomplished by means of a float 7a which is connected by a pulley system 9 to a rotating drum 2 which is located within the indicating means 7 (note right-hand portion of Fig. 2). The pulley system 9 has associated therewith a tape 3 which winds about the drum 2 upon upward movement of float 7a. Numbers on the tape indicate the liquid level.

Referring specifically to Fig. 2, connected to the indicating means 7 is a cam assembly housing 8. Within the housing 8 is a drive shaft 60 which is connected to the rotating axis of the drum 2 in the indicating means 7 by means of a crank arm 4 and pin 5. Hence it can be seen that as the axis of the drum within indicating means 7 rotates in response to a movement of the float 7a, drive shaft 60 will rotate thereby rotating a worm 10 which is connected to the drive shaft 60 by means of a set screw 11. The worm 10 drives a gear 11a. The ratio of the worm and gear arrangement is determined by the height of the tank 6. For example, for a 20' tank a 10:1 ratio of worm to gear is satisfactory. The gear 11a rotates upon a shaft 12. Also connected to the shaft 12 is a cam 13. A cam-following roller 14 is journaled to a lever arm 15 which is pivotally mounted on pivot 16. One end of lever arm 15 is slidably connected to a valve stem 17. Cam-follower 14 moves upwardly in response to the motion of the cam 13 when tank 6 is full of liquid, as shown in Fig. 2. This upward movement of cam-follower 14 causes valve stem 17 to move downwardly by connecting means or lever arm 15. The downward movement of the valve stem 17 results in the cutting off of the gas supply to a tank selector valve. The valve stem 17 moves longitudinally within a valve housing 18, said valve housing 18 having a gas inlet 19, a gas outlet 20, and a gas vent 21 (as shown in Fig. 3).

Fig. 3 shows in detail the valve assembly 18. A coil spring 22 is mounted about valve stem 17 and is adapted to bias the lever arm 15 upwardly. Coil spring 22 is confined by a nut 23 and a sliding member 24. Integral with the valve stem 17 is a gas inlet valve 25 and a gas vent valve 26, both valves moving longitudinally with the valve stem 17 within a space 27 defined by valve housing 18. Provided within the valve housing 18 is a gas inlet valve seat 28 and a gas vent valve seat 29. Both the gas inlet valve 25 and the gas vent valve 26 are tapered as at 30 and 31 to seat flush against the gas inlet valve seat 28 and the gas vent valve seat 29. Each of the valve members has recesses 32 (as shown in Fig. 4), said recesses being so formed as to allow the flow of gases through said valves unless the valves are seated, in which case the flow of gases through the seated valve will be prevented.

In Fig. 5 there is shown a sectional view of a tank selector valve 40 which is utilized for providing gases to control the flow of liquids to a particular tank. This tank selector valve 40 in turn is controlled by my new control pilot 18. The tank selector valve 40 has a vent choke 41, a selector interlock connection 42, a means 43 for connecting the selector valve to a three-way diaphagm valve and a means 44 for connecting the tank selector valve to my new control pilot 18. A coil spring 45 is confined within the tank selector valve 40 and biases a piston 46 upwardly. Piston 46 has a groove 47 cut therein. A reset lock 48 which is biased inwardly by a compression spring 49 is adapted to fit within the groove 47 in piston 46. A reset handle 50 is also provided, the operation of which will be explained subsequently. In addition, a relief groove 61 is cut in the reset handle rod to release gas trapped above the piston.

The operation of my new system will now be explained. Referring to Fig. 1, let it be assumed that tank 6 is partially filled with a liquid, such as oil, and is filling. The float 7a being below the top level cut-off position, the cam 13 will not be in a position to cause valve stem 17 to move downwardly. Therefore, the double valve of my new control pilot will be in a position such that gas vent valve 26 is seated against the gas vent valve seat 29 with the gas inlet valve being open thereby permitting gas from the gas supply line to flow out of gas outlet 20 to the gas selector valve 40. For purposes of clarity, gas selector valves 40, 40a, and 40b are shown enlarged. The pressure of the gas forces piston 46 within the tank selector valve 40 into the down position allowing gas pressure to go out of the tank valve port 43 to diaphragm valve 51 thereby holding diaphragm valve 51 in the open or liquid-filling position. Gas pressure in the tank selector valve 40 is also directed through the selector interlock port 42 to all the other selector valves such as 40a and 40b in the system. This pressure being under the piston in all other selector valves, together with the spring tension beneath the pistons of these valves, holds these valves in the up position. Hence the tank valve ports 43 in all other tank selector valves are obstructed and pressure cannot be transmitted through these ports to the diaphragm valves, such as 51a and 51b. When tank 6 becomes full the cam member 13 will be in the position shown in Fig. 2 and the cam lever 15 will move valve stem 17 downwardly against the bias of the coil spring 22 thereby unseating the gas vent valve 26 and seating the gas inlet valve 25 which results in a shutting off of the gas supply to selector valve 40. The pressure in the top of the piston 46 in selector valve 40 will be bled from above this piston through gas vent 21 in valve assembly 18. This allows the spring tension in spring 45 to return piston 46 to the up position past the reset lock 48 which fits in groove 47 so that piston 46 becomes locked in the up position. As soon as the piston 46 in tank selector valve 40 of tank 6 rises to the closed position supply gas is no longer available to go through ports 42 and pressure to all other tank selector valves in the system is bled off through vent chokes 41. As soon as this pressure is bled off tank selector valve 40b, which has been placed in the ready position by an operator pulling out reset lock 48 and pushing down reset handle 50, gas supply pressure on top of its piston overcomes the spring tension beneath its piston and moves the piston downwardly. As soon as its piston reaches the downward position, pressure is also bled through port 42 of tank selector valve 40b to all other valves holding them in the closed position if they have not already been locked out by reset lock 48. During the time that tank 6b is being filled, tank 6a which was originally filled with liquid, has been run to the pipe line and back-gauged. After gauging, reset lock 48 of tank selector valve 40a is pulled out and reset handle 50 of tank selector valve 40a is depressed and lock 48 allowed to return to the top of the piston thereby holding the tank selector valve 40a in the tank ready position. In the tank ready position, gas pressure from the level control pilot of tank 6a is admitted through port 44 of tank selector valve 40a to the top of the piston 46. However, the tank valve port leading to the three-way diaphragm valve 51a remains closed by reason of the pressure underneath piston 46 in tank selector valve 40a being supplied by tank selector valve 40b of the filling tank 6b plus the tension of the spring 45. As soon as tank 6b becomes filled with liquid, tank selector valve 40b moves to the closed and locked position and bleeds pressure from beneath the piston 45 in valve 40b which has been set in the ready position. This valve then operates to open flow of liquid into tank 6a.

Having described my invention, what I wish to claim and secure by Letters Patent is:

1. In a system for controlling the filling of a plurality of storage tanks including indicating means for indicating the amount of liquid contained in each storage tank, said indicating means including a rotatable shaft the improvement which comprises a worm connected to said rotatable shaft, a rotatable cam shaft, a gear mounted on said cam shaft and rotatable therewith, said gear engagedly connecting with said worm, a cam mounted on said cam shaft and rotatable therewith, a cam follower engagedly contacting said cam, a pivoted lever connected to said cam follower, a valve housing provided with a valve chamber, a fluid inlet, a fluid outlet and a fluid vent, a valve stem positioned in said valve chamber connecting with said lever, dual valve seats arranged in said valve chamber, said valve stem having valve elements positioned thereon adapted to seat in said valve seats, said valve stem having biasing means positioned thereon adapted to normally bias said valve stem to permit fluid flow through said inlet and outlet, said lever being adapted to actuate said valve stem to close off said inlet and open said venting means upon movement of said lever by said cam follower.

2. A system for controlling the filling of a plurality of storage tanks comprising first valve means adapted to control liquid supply to said tanks, second valve means adapted to control said first valve means and third valve means adapted to control fluid flow from a fluid source to said second valve means, each of said first, second, and third valve means being associated with each of said tanks, respectively, said second valve means having a first tank filling position wherein fluid communication is provided through said second valve means between said third valve means and said first valve means, a second lock position, wherein fluid communication between said second valve means and said first valve means and between said second valve means and said third valve means is sealed off, and a third ready position, wherein fluid communication between said second valve means and said first valve means is sealed off and wherein fluid communication is provided between said second valve means and said third valve means, each of said second valve means being in fluid communication with each other in each of said three valve positions.

3. A system for controlling the filling of a plurality of storage tanks comprising diaphragm valves adapted to control liquid supply to said tanks, tank selector valves adapted to control said diaphragm valves and pilot valves adapted to control fluid flow from a fluid source to said tank selector valves, each of said diaphragm valves, tank selector valves and pilot valves being associated with each of said tanks, respectively, said tank selector valves having a first tank filling position, wherein fluid communication is provided through said tank selector valves between said pilot valves and said diaphragm valves, a second lock position, wherein fluid communication between said tank selector valves and said diaphragm valves and between said tank selector valves and said pilot valves is sealed off, and a third ready position, wherein fluid communication between said tank selector valves and said diaphragm valves is sealed off and wherein fluid communication is provided between said tank selector valves and said pilot valves, each of said tank selector valves being in fluid communication with each other in each of said three positions, said tank selector valves having a fluid venting means arranged thereon.

4. A system as recited in claim 3 wherein when one of said tank selector valves is in said first position, one other of said tank selector valves is in said third position and said remaining tank selector valves are in said second position.

5. A system for controlling the filling of a plurality of storage tanks, each of said storage tanks being provided with indicating means for indicating the amount of liquid contained in each tank, each of said indicating means including a rotatable shaft comprising diaphragm valves adapted to control liquid supply to said tanks, tank selector valves adapted to control said diaphragm valves and pilot valves adapted to control fluid flow from a fluid source to said tank selector valves, each of said diaphragm valves, tank selector valves and pilot valves being associated with each of said tanks, respectively, each of said pilot valves including a valve housing provided with a chamber, a fluid inlet, a fluid outlet and a fluid vent, upper and lower valve seats arranged in said chamber, a valve stem provided with upper and lower valve members adapted to close off said valve seats whereby fluid communication is provided between said inlet and said outlet when said valve is in one position and fluid communication is provided between said chamber and said outlet and said vent when said valve stem is in a second position, a worm connected to each of said rotatable shafts, a rotatable cam shaft, a gear and a cam mounted on said shaft for rotation therewith, said gear engaging with said worm, a cam rider engaging with said cam, a pivoted lever connected to said cam rider, said lever being connected to said valve stem whereby movement of said lever actuates said valve stem, said tank selector valves having a first tank filling position, wherein fluid communication is provided through said tank selector valves between said pilot valves and said diaphragm valves, a second lock position, wherein fluid communication between said tank selector valves and said diaphragm valves and between said tank selector valves and said pilot valves is sealed off, and a third ready position, wherein said fluid communication between said tank selector valves and said diaphragm valves is sealed off and wherein fluid communication is provided between said tank selector valves and said pilot valves, each of said tank selector valves being in fluid communication with each other when said tank selector valve is in each of its three positions, and a venting bleed port arranged on each of said tank selector valves.

6. A system as recited in claim 5 wherein when one of said tank selector valves is in said first position another of said tank selector valves is in said third position and said remaining tank selector valves are in said second position.

References Cited in the file of this patent
UNITED STATES PATENTS

| | | |
|---|---|---|
| 1,031,955 | Nash | July 9, 1912 |
| 1,795,288 | Browne | Mar. 10, 1931 |
| 2,216,039 | Mason | Sept. 24, 1940 |